(12) United States Patent
Agrawal et al.

(10) Patent No.: US 12,179,785 B2
(45) Date of Patent: Dec. 31, 2024

(54) AUGMENTED REALITY INCIDENT PROJECTION BASED ON VEHICLE MOVEMENTS

(71) Applicant: INTERNATIONAL BUSINESS MACHINES CORPORATION, Armonk, NY (US)

(72) Inventors: Tushar Agrawal, West Fargo, ND (US); Martin G. Keen, Cary, NC (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 18/171,979

(22) Filed: Feb. 21, 2023

(65) Prior Publication Data
US 2024/0278797 A1     Aug. 22, 2024

(51) Int. Cl.
*B60W 50/14*       (2020.01)
*B60K 35/00*       (2024.01)
(Continued)

(52) U.S. Cl.
CPC ............ *B60W 50/14* (2013.01); *B60K 35/00* (2013.01); *B60W 30/0956* (2013.01);
(Continued)

(58) Field of Classification Search
CPC ............ B60W 50/14; B60W 30/0956; B60W 50/0097; B60W 2050/0028;
(Continued)

(56) References Cited

U.S. PATENT DOCUMENTS

| 7,400,233 B2 * | 7/2008 | Kondo | B60Q 9/008 340/908 |
| 8,463,486 B2 | 6/2013 | Park et al. | |

(Continued)

FOREIGN PATENT DOCUMENTS

| CN | 106494409 A | 3/2017 |
| CN | 114228491 A | 3/2022 |
| WO | 2022164347 A1 | 8/2022 |

OTHER PUBLICATIONS

Disclosed Anonymously, "Method to Minimize Vehicle Collision in Unavoidable Circumstances", IP.com Prior Art Database Technical Disclosure, IP.com No. IPCOM000245512D, Mar. 13, 2016, 4 pgs.
(Continued)

*Primary Examiner* — John A Tweel, Jr.
(74) *Attorney, Agent, or Firm* — Kristofer Haggerty

(57) ABSTRACT

A computer-implemented method, a computer system and a computer program product project incident information within an augmented reality environment based on vehicle movements. The method includes determining a predicted path of a vehicle based on telemetry data associated with the vehicle. The method also includes obtaining driving conditions associated with a surrounding environment using a sensor. In addition, the method includes identifying an object in the predicted path of the vehicle. The method further includes determining a collision zone on the object and a corresponding collision zone on the vehicle based on physical attributes of the object and the predicted path of the vehicle. Lastly, the method includes generating a display of the driving conditions using an augmented reality device, where the display indicates the collision zone on the object and includes a virtual model of the vehicle that indicates the corresponding collision zone on the vehicle.

20 Claims, 3 Drawing Sheets

(51) Int. Cl.
*B60K 35/28* (2024.01)
*B60W 30/095* (2012.01)
*B60W 50/00* (2006.01)
*G06N 20/00* (2019.01)
*B60K 35/29* (2024.01)

(52) U.S. Cl.
CPC ......... *B60W 50/0097* (2013.01); *G06N 20/00* (2019.01); *B60K 35/28* (2024.01); *B60K 35/29* (2024.01); *B60K 2360/171* (2024.01); *B60K 2360/177* (2024.01); *B60K 2360/1868* (2024.01); *B60W 2050/0028* (2013.01); *B60W 2050/146* (2013.01); *B60W 2556/10* (2020.02); *B60W 2556/65* (2020.02)

(58) Field of Classification Search
CPC ........ B60W 2050/146; B60W 2556/10; B60K 35/00; B60K 35/28; B60K 35/29; B60K 2360/171; B60K 2360/177; B60K 2360/1868; G06N 20/00
See application file for complete search history.

(56) References Cited

U.S. PATENT DOCUMENTS

| | | | |
|---|---|---|---|
| 9,218,698 B2 | 12/2015 | Ricci | |
| 9,469,248 B2 * | 10/2016 | Ng-Thow-Hing | B60Q 9/00 |
| 9,858,676 B2 * | 1/2018 | Bostick | G02B 27/017 |
| 9,922,374 B1 * | 3/2018 | Vose | G08G 1/0129 |
| 10,131,348 B2 | 11/2018 | Sugita et al. | |
| 10,479,273 B2 | 11/2019 | Stefan et al. | |
| 10,699,916 B2 | 6/2020 | Kasai | |
| 10,789,839 B2 | 9/2020 | Kawai et al. | |
| 11,093,762 B2 | 8/2021 | Siegemund et al. | |
| 11,106,203 B2 * | 8/2021 | Huang | H04N 13/122 |
| 11,195,031 B2 | 12/2021 | Thompson et al. | |
| 11,257,371 B2 | 2/2022 | Aoude et al. | |
| 11,794,766 B2 * | 10/2023 | Khan | B60W 30/0956 |
| 11,854,418 B2 * | 12/2023 | Gupta | G08G 5/0026 |
| 2021/0034886 A1 | 2/2021 | Murray et al. | |
| 2021/0134156 A1 | 5/2021 | Lee | |

OTHER PUBLICATIONS

IBM, "Automotive Industry Architecture", IBM.com, [accessed Feb. 9, 2023], 9 pgs., Retrieved from the Internet: <https://www.ibm.com/cloud/architecture/architectures/automotive/>.

IBM, "Computer Vision and Augmented Reality", IBM.com, [accessed Dec. 20, 2022], 12 pgs., Retrieved from the Internet: <https://web.archive.org/web/20220125122655/https://research.ibm.com/haifa/dept/imt/cvar/index.html>.

IBM, "Computer Vision", IBM.com, [accessed Feb. 9, 2023], 8 pgs., Retrieved from the Internet: <https://research.ibm.com/topics/computer-vision>.

IBM, "Disruptive Automotive Technology Solutions", IBM.com, [accessed Feb. 9, 2023], 6 pgs., Retrieved from the Internet: <https://www.ibm.com/industries/automotive>.

IBM, "IBM Institute for Business Value, Automotive 2025—How Consumers, Mobility, and Blurred Boundaries Disrupt the Industry", IBM.com, [accessed Feb. 9, 2023], 7 pgs., Retrieved from the Internet: <https://www.ibm.com/thought-leadership/institute-business-value/report/auto2025>.

IBM, "IoT Solutions", IBM.com, [accessed Feb. 9, 2023], 8 pgs., Retrieved from the Internet: <https://www.ibm.com/cloud/internet-of-things>.

IBM, "The Weather Company", IBM.com, [accessed Dec. 20, 2022], 7 pgs., Retrieved from the Internet: <https://www.bm.com/weather/apps>.

IBM, "What's Next in AI is Foundation Models at Scale", IBM.com, [accessed Feb. 9, 2023, 12 pgs., Retrieved from the Internet: <https://research.ibm.com/artificial-intelligence>.

Jayanthi, et al., "Vehicle Insurance Calculator Using Augmented Reality", 2019 5th International Conference on Advanced Computing & Communication Systems (ICACCS), Mar. 15-16, 2019, Coimbatore, India, IEEE, pp. 766-770.

Subaru Canada, "Mobile.Subaru", Subara Canada website home page, [accessed Feb. 21, 2023], 2 pgs., Retrieved from the Internet: <https://m.subaru.ca/WebPage.aspx?WebSiteID=282>.

Subaru, "Subaru Features & Benefits, Forester, Rearview Camera", Subaru.ca, [accessed Feb. 10, 2023], 7 pgs., Retrieved from the Internet: <https://m.subaru.ca/WebPage.aspx?WebSiteID=282&WebPageID=24357&Range=Forester&ModelYear=2023>.

\* cited by examiner

AUGMENTED REALITY INCIDENT PROJECTION BASED ON VEHICLE MOVEMENTS

BACKGROUND

Embodiments relate generally to the field of projecting events in an augmented reality environment, and more specifically, to using vehicle surroundings and movements to provide an augmented reality projection of predicted incidents involving the vehicle.

Augmented reality (AR) technology may provide a real-time view of a physical, real-world environment whose elements are augmented with computer-generated virtual elements, which may include sound, video, graphics and/or positioning data. For instance, a user may wear a headset or other apparatus that could allow the user to view an enhanced environment, where a surrounding real-world environment has been overlaid with graphics or text that may be connected to data from various sources, including servers or other devices that may be connected through a computer network, and may include predictions or other information such as virtual models of physical objects that may be detected in the surrounding real-world environment.

SUMMARY

An embodiment is directed to a computer-implemented method for projecting incident information within an augmented reality environment based on vehicle movements. The method may include determining a predicted path of a vehicle based on telemetry data associated with the vehicle. The method may also include obtaining driving conditions associated with a surrounding environment using a sensor, where the driving conditions are selected from a group consisting of: image data, audio data and text data. In addition, the method may include identifying an object in the predicted path of the vehicle. The method may further include determining a collision zone on the object and a corresponding collision zone on the vehicle based on physical attributes of the object and the predicted path of the vehicle. Lastly, the method may include generating a display of the driving conditions using an augmented reality device, where the display indicates the collision zone on the object and includes a virtual model of the vehicle, wherein the virtual model of the vehicle indicates the corresponding collision zone on the vehicle.

In another embodiment, the virtual model of the vehicle may include information based on a determination of a vehicle damage level from a potential collision with the object.

In an additional embodiment, the method may include creating a digital twin instance for the object. In this embodiment, the method may also include simulating a collision between the object and the vehicle using the digital twin instance and updating the vehicle damage level in a potential collision with the object based on a digital twin simulation output.

In a further embodiment, the method may include forming a communications network between the vehicle and a second vehicle and obtaining the driving conditions associated with the surrounding environment from the second vehicle.

In yet another embodiment, the display may include a second virtual model of the second vehicle that indicates a second collision zone on the second vehicle.

In another embodiment, a machine learning model that predicts a path of a moving vehicle based on vehicle data and historical driving information associated with a driver may be used to determine the predicted path of the vehicle.

In a further embodiment, the augmented reality device is worn by a driver of the vehicle.

In addition to a computer-implemented method, additional embodiments are directed to a computer system and a computer program product for projecting incident information within an augmented reality environment based on vehicle movements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
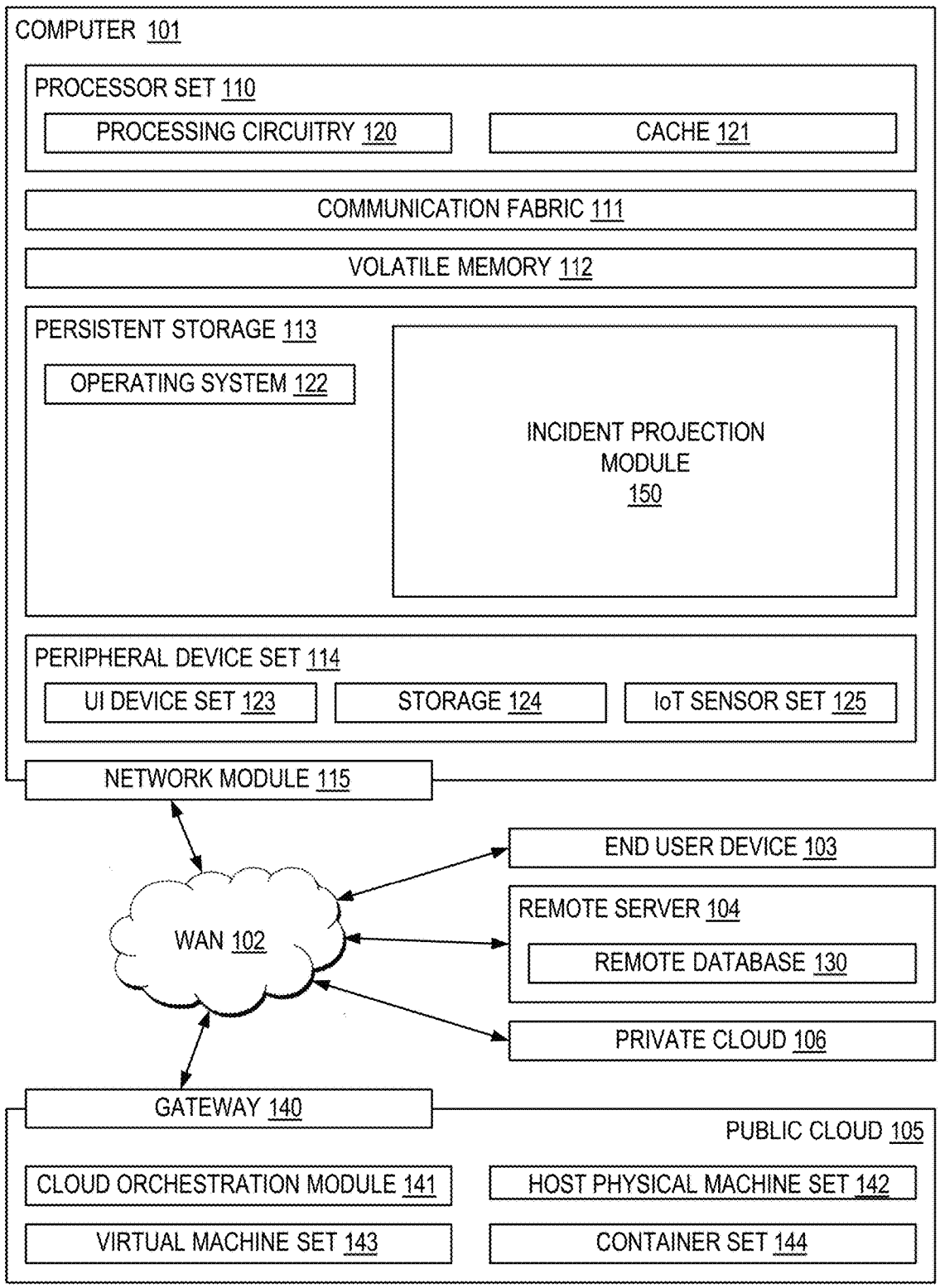
FIG. 1 depicts a block diagram of an example computer system in which various embodiments may be implemented.

As the transportation system transitions to more autonomous and semi-autonomous vehicles, both vehicles and drivers may be more reliant on devices and sensors that connect to communications networks. Information may be collected about the surrounding environment and sent to the vehicle directly for processing or to a human driver to make decisions about different actions that could be taken. In preserving the safety of vehicles and passengers, it may be important to prevent various types of incidents where objects in the surrounding environment, e.g., trees or light poles or other vehicles, collide with vehicles and cause damage. There are currently several types of incident prediction systems for vehicles that alert the vehicle or driver, such that the driver can make appropriate driving decisions to avoid incidents. These systems may use speed of the vehicle as a parameter for the alert, and by controlling vehicle speed, the incident can be avoided. However, it is also possible for incidents to occur at slow speed, such as if a vehicle needs to pass through a narrow passage and could be scratched as a result. Other such systems are "back-up cameras," where a camera may be mounted on the rear of a vehicle and display an image to a human driver as the vehicle is backed out of an area such as a parking space. The driver may make decisions based on the video that is displayed and avoid incidents as well. Incident prevention systems typically include video or other information that may be gathered to display driving conditions to a vehicle or driver but generally are not able to provide context to the vehicle or driver about the effect that detected obstructions and resulting incidents that may occur may have to the vehicle, such as a location on the vehicle that may be damaged if specific objects collide with the vehicle if a specific path is followed, where the specific path may be predicted from vehicle telemetry data.

It may therefore be useful to provide a method or system to project incident information within an augmented reality environment to a driver based on vehicle movements. Augmented reality (AR) applications, which may become more common in today's technology ecosystem, may offer a real-time view of a physical, real-world environment whose elements are "augmented" by computer-generated sensory input such as sound, video, graphics and positioning data. A display of the surrounding environment around a vehicle may be enhanced by augmented data pertinent to the surroundings, e.g., graphical or textual information, and a headset, also known as AR "glass," may be provided to a driver to see the augmented display. An augmented reality application may use images in the surrounding environment from a camera or any type of sensor, which may also determine position based on global positioning satellite (GPS) data, triangulation of a device's location, or other positioning methods. The application may then overlay the camera view of the surrounding environment with indicators such as highlighting obstructions or text indicating distance to the obstruction. Virtual reality (VR) environments may also be used as an alternative, with the difference that instead of displaying the actual surroundings as the background, an entirely artificial environment may be rendered by a virtual reality application with similar enhancements made to the objects in the field of view. In both cases, a virtual model of the vehicle may also be shown to a driver to provide the context of the effect of potential incidents on the vehicle as mentioned above, most importantly a collision zone on the vehicle may be indicated so that the driver may be aware of how the vehicle may be damaged by following the current path and may make specific driving decisions to avoid an incident. Such a method or system may improve existing vehicle incident avoidance systems by providing more detailed data directly to a driver that may predict incident effects based on vehicle movements and driver actions. As a result, driver and passenger safety may be improved and the efficiency of incident avoidance systems may be enhanced.

Referring to FIG. 1, computing environment 100 contains an example of an environment for the execution of at least some of the computer code involved in performing the inventive methods, such as incident projection module 150. In addition to incident projection module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and incident projection module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in incident projection module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in incident projection module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to project incident information within an augmented reality environment based on vehicle movements. Specifically, incident projection module 150 may capture telemetry data from a vehicle with the purpose of predicting a path of the vehicle. The module 150 may then obtain driving conditions from the surrounding environment through video, audio or text data that may be capturing using appropriate sensors. It should be noted that driving conditions in this context refers to specific aspects of the surrounding environment that may be the cause of incidents involving the vehicle, such as objects or obstructions or weather conditions or any relevant aspect of the surrounding environment. Objects or obstructions in the surrounding environment that may be in the predicted path of the vehicle may then be identified by the module 150 as potentially colliding with the vehicle should the predicted path be maintained. Identifying the objects may include learning about specific characteristics, such as size or hardness, of the object. For example, a small pebble that might be in the road may not be a threat to cause an incident with a vehicle, nor an object that is not hard such as paper or other trash. The characteristics of the object are not limited to size and hardness but are mentioned as examples of aspects of the identification of objects in the predicted path of the vehicle. The module 150 may then determine a collision zone for both the object and the vehicle that may define where the object and vehicle may collide. The collision zone may be determined separately for the object and vehicle, such that the collision zone may be projected onto the respective object or vehicle in the augmented reality display described below.

Using the driving conditions and information about the surrounding environment, along with the specific information about the predicted path of the vehicle and the identified object, the module 150 may generate an augmented reality display of the surrounding environment in a headset that may be worn by a driver or any other person, where the display may indicate the collision zone on the identified object within the display. In addition, a virtual model of the vehicle may be created as part of the display that indicates the collision zone on the vehicle. Included in the indication on the vehicle may be graphical or text data indicating a predicted extent of the damage, where the prediction may consider the information about the identified object, e.g., size or hardness, and also the telemetry data that was used by the module 150 to predict the path of the vehicle. The augmented reality display may be used to make driving decisions with the purpose of avoiding a collision between the vehicle and object and it should be noted that the display is not required to be static and may be updated as changes are made to the characteristics of the vehicle path, e.g., speed or direction are changes, and new telemetry data may be received by the module 150.

Figure 2:
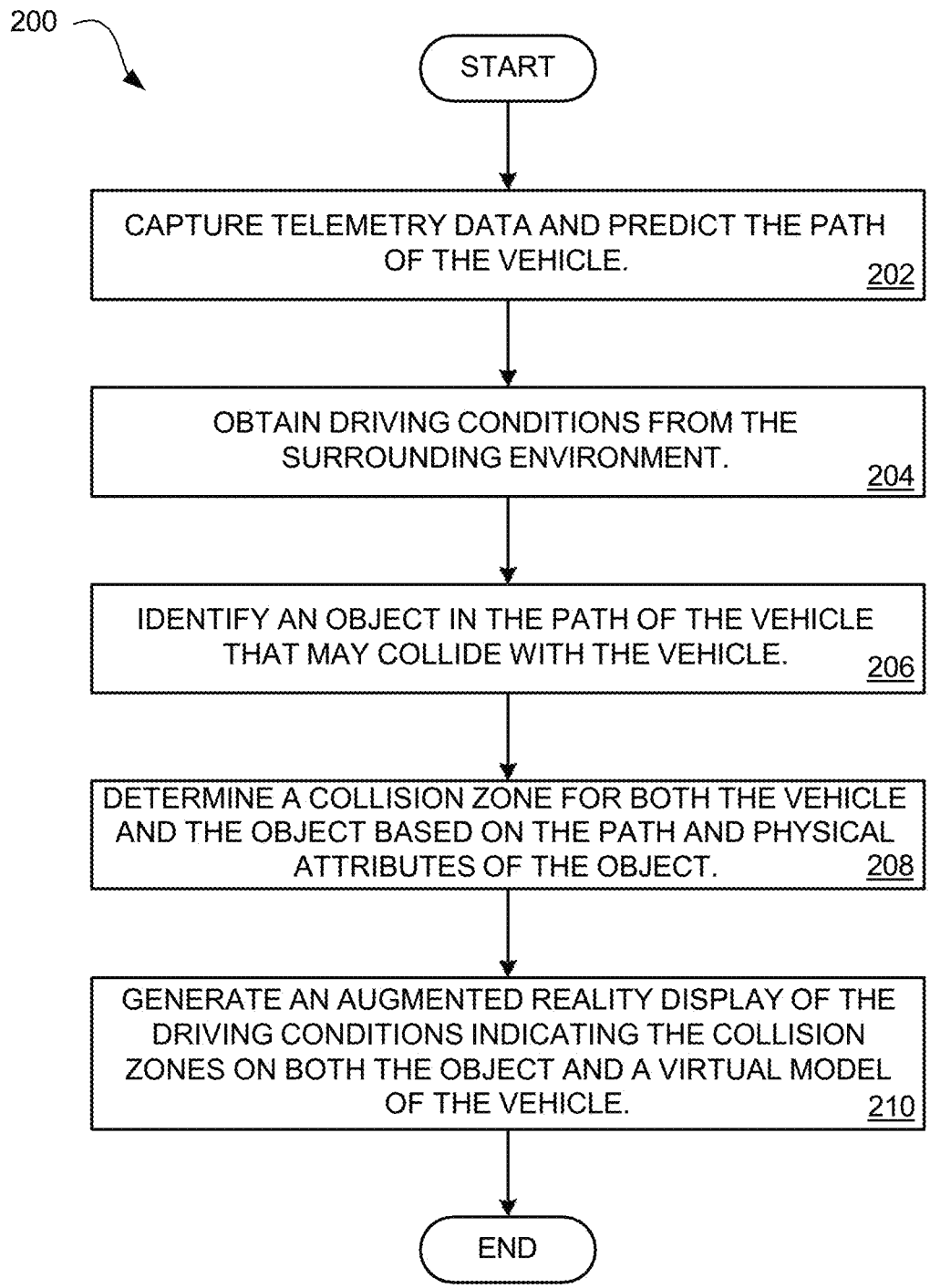
FIG. 2 depicts a flow chart diagram for a process that projects incident information within an augmented reality environment based on vehicle movements according to an embodiment.

Referring to FIG. 2, an operational flowchart illustrating a process 200 that projects incident information within an augmented reality environment based on vehicle movements is depicted according to at least one embodiment. At 202, telemetry data may be captured from a vehicle. This step may include the registering of the vehicle with the incident projection module 150 and may include simple telemetry from the vehicle, such as speed or direction. Data that may be obtained at this step may include real-time angular rotation of the steering wheel or changes in steering wheel angular movement, as this information may provide the best prediction for the vehicle path or whether a movement is safe or result in an incident between the vehicle and the surrounding environment.

One of ordinary skill in the art will recognize that the data captured at this step is not required to be from a single vehicle but may also be sourced from other vehicles through an appropriate network or from other vehicles directly. As such, temporal ad-hoc networks may be formed at this step using potential network technologies such as Vehicle-to-vehicle (V2V), where vehicle sensors and communication devices may communicate with surrounding vehicles in real time, or Vehicle-to-infrastructure (V2I), where vehicles may communicate with infrastructure such as traffic lights, road signs, other vehicles, or the like. This list should not be seen as limiting as there may be further technologies and locations for sensors or cameras to source the telemetry data to be used by the module 150 to learn about the vehicle and predict the path. The module 150 may also use a traffic simulation model to analyze current and future traffic flows on major roads, intersections, and highways to identify areas of congestion or collisions.

Information captured at this step may also include information specific to a driver. It should be noted that all collection of information from a driver or any video, audio or text that may personally identify a human driver or is sensitive in any other way requires the informed consent of all people whose information may be collected and analyzed by incident projection module 150. Consent may be obtained in real time or through a prior waiver or other process that informs a subject that their information may be captured by a device or other process and that the information may be used to predict the path of the vehicle and provide augmented reality projections of the effects of potential incidents between the vehicle and the surrounding environment, as will be described in detail below. The information owner is free to decide at any time to revoke consent for use of sensitive information as these settings are permanently retained to keep the incident projection module 150 updated with the latest information and also allow the owner of the information complete control over their informed consent to use sensitive information in the process described herein. The consent described here may also refer to allowing some, or any, data relating to the information owner from being sent to a local server, cloud server or any other location. The owner has complete control on the transmission of information that may be sensitive or personally identify the owner of the information. It should be noted that in addition to consent with respect to personally identifying information, consent may also be requested and received from any user with respect to devices that may be owned by the user, such as augmented reality (AR) equipment or 3D printing systems that may be used as described below. As with the information described above, this consent is also revocable at any time should conditions change for any reason.

In an embodiment, a supervised machine learning model may be trained to predict the path of a vehicle based on the telemetry data from the vehicle and other information that may already be known about the vehicle or driver. One or more of the following machine learning algorithms may be used: logistic regression, naive Bayes, support vector machines, deep neural networks, random forest, decision tree, gradient-boosted tree, multilayer perceptron. In an embodiment, an ensemble machine learning technique may be employed that uses multiple machine learning algorithms together to assure better classification when compared with the classification of a single machine learning algorithm. In this embodiment, training data for the model may include historical information about a vehicle, including dimensions and shape of a vehicle or other fixed specifications of a vehicle, but may also extend to prediction of driver movements using learned behaviors that may be specific to the driver. The training data may be collected from a single vehicle or multiple vehicles over a longer period of time. The results may be stored in a database so that the data is most current, and the output would always be up to date.

At 204, driving conditions may be obtained from the surrounding environment using cameras and sensors that may be fixed or mounted in a stationary location or may be fitted to a vehicle. One example may be the installation of forward-facing, rear, side repeater, or internal cameras that may detect objects and people around the vehicle, as well as monitor driver behavior. Other examples include radar that may be installed on each side of the vehicle for obstacle detection, braking and steering assistance, autonomous driving functions, blind spot monitoring or other driving conditions, built-in sensors that may gather data on steering angle, wheel speed, brake pedal pressure, throttle position and other vehicle functions that help evaluate driver behavior, road conditions and the like. These cameras and sensors may determine driving conditions, e.g., object presence, relative location, and type along with vehicle performance data like speed or braking.

The driving conditions obtained at this step may be used to create a 3D model of the surrounding that may place the vehicle within the visual 3D model. Many methods may be used at this step, e.g., Convolutional Neural Networks (CNN), which may utilize the camera data to generate an accurate 3D model of the environment through computer vision and object recognition techniques, where objects may be recreated in the model based orientation and distance from the vehicle, Mobile LiDAR, where a 3D laser scanner mounted on the vehicle may scan the environment to generate a high-resolution map of the surrounding environment based on object identification and object distance estimation, or Recurrent Neural Networks (RNN), which may process sensor data over time to generate a continuous stream of object observations and allow the system to adapt and update as conditions change. Driving conditions as described herein may also include information about weather conditions, either through sensor data that may describe the conditions or through video information from cameras that may provide a physical representation of the conditions, such as rain, snow or ice. Such weather information may assist in the prediction of the effect of the surrounding environment and driving conditions on the potential for an incident and may be recreated in the augmented reality environment. For instance, wet roads may cause a possible lack in traction and issues for the driver pertaining to steering, turning, braking and possibly exacerbate potential damage in an incident, which may then be projected in the augmented reality environment. In cold weather environments, Snow, ice, or slush may further exacerbate the situation of steering and handling on the road, which may also be projected to the driver in the augmented reality environment through the 3D model, along with potential warnings about the driving conditions.

At 206, the incident projection module 150 may identify an object in the predicted path of the vehicle that may collide with the vehicle if the predicted path is followed by the vehicle. As part of the identification, the module 150 may also obtain information regarding specific physical attributes of the object, including the size of the object, e.g., larger objects may be more of a threat to a vehicle in a potential incident and also the shape of the object, such as sharp edges that may cause scrapes or scratches, and then the relative hardness of the object, where a higher hardness level may cause more damage to a vehicle. As part of the hardness calculation, a hardness map of the surrounding objects may be generated by simulating contact with objects and comparing to a known reference material, or a hardness feature vector may be created and analyzed, where various features, such as curvature, connectivity, exposed edges, etc., may be used to predict object hardness.

In an embodiment, a supervised machine learning model may be trained to predict the hardness of an object based on the identification of the object and the obtained driving conditions. One or more of the following machine learning algorithms may be used: logistic regression, naive Bayes, support vector machines, deep neural networks, random forest, decision tree, gradient-boosted tree, multilayer perceptron. In an embodiment, an ensemble machine learning technique may be employed that uses multiple machine learning algorithms together to assure better classification when compared with the classification of a single machine learning algorithm. In this embodiment, training data for the model may include historical information about objects of the same type or with the same or similar attributes that may or may not include prior incidents between objects in the training data and other objects, such as a vehicle or other moving object. The training data may be collected from a single object or multiple objects over a longer period of time, where the objects need not be identical to the object under analysis. The results may be stored in a database so that the data is most current, and the output would always be up to date. It should also be noted that this supervised machine learning model technique may also be used to determine the effect of a potential incident on a vehicle that will be described below.

At 208, the incident projection module 150 may determine a collision zone for the object and a corresponding collision zone for the vehicle. Determining collision zones, or locations, may also include determining a magnitude of the impact and, therefore, an effect of a potential collision with the object on the vehicle.

In an embodiment, determining the effect of an impact on a vehicle in a potential incident may be accomplished through a digital twin simulation of the potential incident that may achieve maximum precision in the determination of effect and also to capture multiple datapoints. A digital twin is a virtual model designed to accurately reflect a physical object. The object being studied, e.g., the vehicle or the object, may be outfitted with various sensors related to vital areas of functionality which produce data about different aspects of the physical object's performance or physical attributes. This data may then be relayed to a processing system and applied to the digital copy. Once informed with such data, the virtual model can be used to run simulations of incidents where the object and vehicle collide, and then study performance issues and generate possible improvements, including ways to avoid the collision or minimize the effect, all with the goal of generating valuable insights, all of which may then be applied back to the original physical object.

Although simulations and digital twins both utilize digital models to replicate various processes, a digital twin is actually a virtual environment and while a simulation typically studies one particular process, a digital twin can itself run any number of useful simulations in order to study multiple processes. Digital twins are designed around a two-way flow of information that first occurs when object sensors provide relevant data to the system processor and then happens again when insights created by the processor are shared back with the original source object. By having better and constantly updated data related to a wide range of areas, along with the added computing power that accompanies a virtual environment, digital twins are able to study more issues from far more vantage points than standard simulations and have greater ultimate potential to improve products and processes. Examples of the types of digital twins include component twins, which are the basic unit of digital twin or the smallest example of a functioning component, parts twins, which pertain to components of slightly less importance, asset twins, which study the interaction between components that work together, system (or unit) twins, which enable you to see how different assets come together to form an entire functioning system, and process twins, which are the macro level of magnification and reveal how systems work together to create an entire production facility, which may help determine the precise timing schemes that ultimately influence overall effectiveness. It should be noted that a digital twin simulation of the object may also be used to make the hardness level determination that was described in 206.

At 210, an augmented reality (AR) display of the driving conditions may be generated that indicates the collision zone on the object and also includes a virtual model of the vehicle that may indicate the collision zone on the vehicle if an incident or collision occurs between the object and vehicle. Included in the display may be the prediction of hardness or other physical attributes of the object or the prediction of the effect on the vehicle of a potential incident or collision, including an estimate of damage to the vehicle. The predicted path of the vehicle may also be displayed in the AR environment and the module 150 may make a prediction of driving decisions that may be made to avoid a potential incident or collision, including text or graphics indicating a path that may be safe, i.e., avoids the object. The augmented reality device that may display the AR environment may include a display that is mounted inside the vehicle that may be viewed by the driver or passengers of the vehicle or may be a headset that is worn by the driver or passengers. The resulting display may be an actual view of the surroundings from a camera or other device or may also be computer-generated with the enhancements or other information mentioned above overlaid on the view. The virtual model of the vehicle may also be overlaid on the display, such that the vehicle may be seen simultaneously to the surrounding driving conditions.

As mentioned above, driving conditions may include telemetry or other data received from other vehicles by forming a communications network and retrieving the data. In this way, the augmented reality display may also be sent to other vehicles, such that path predictions, identified objects and collision zones may be shared among vehicles or each vehicle may receive information that is specific to the vehicle or driver. In addition, the incident projection module 150 may continuously monitor the driving conditions and telemetry data from one or more vehicles and update predictions of vehicle path and effect of potential incidents or collisions as the inputs change. Also, it should be noted that the display may also proactively provide information to the driver about how to avoid the potential incident or collision that may have been detected or predicted. This information may include text in the display that may be seen by a driver or passenger or may take the form of a visible or audible warning notification to the driver or passenger.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 3A:
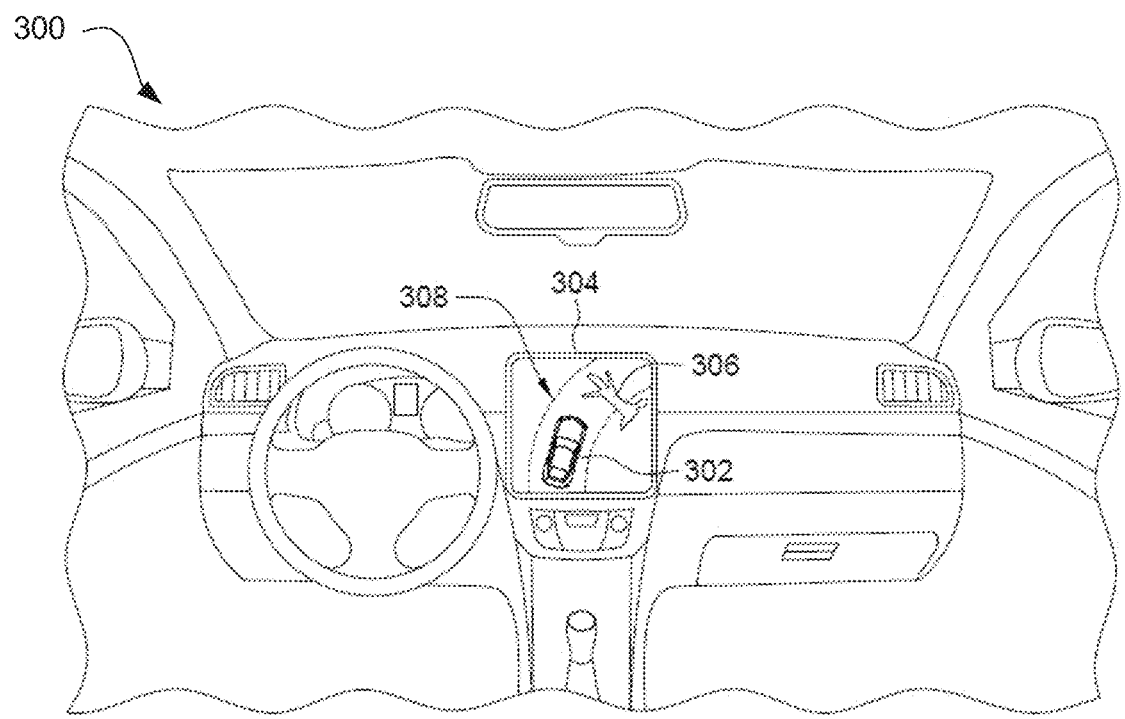
FIGS. 3A and 3B depict example views of the process that projects incident information within an augmented reality environment based on vehicle movements according to an embodiment.
Figure 3B:
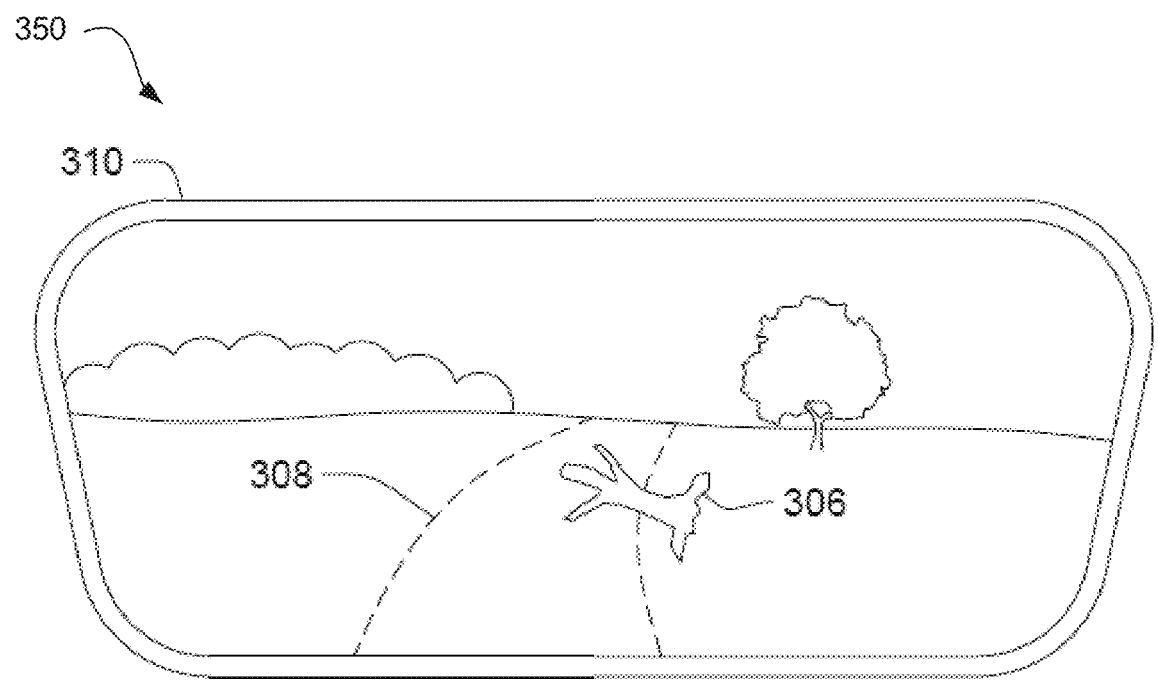

FIGS. 3A and 3B depict examples of the process that projects incident information within an augmented reality environment based on vehicle movements according to an embodiment. FIG. 3A illustrates the use of an augmented reality display 304 in view 300 while FIG. 3B illustrates the use of a headset 310 in view 350.

As noted above with respect to step 210 of FIG. 2, an augmented reality (AR) display 304 of the driving conditions may be generated that indicates the collision zone 308 on the object 306 and also includes a virtual model of the vehicle 302 that may indicate the collision zone 308 on the vehicle 302 if an incident or collision occurs between the object 306 and vehicle 302. The augmented reality device that may display the AR environment may include the display 304 that is mounted inside the vehicle 302 that may be viewed by the driver or passengers of the vehicle 302 or may be a headset 310 that is worn by the driver or passengers. The resulting display may be an actual view of the surroundings from a camera or other device or may also be computer-generated with the enhancements or other information mentioned above overlaid on the view. The virtual model of the vehicle 302 may also be overlaid on the display 304, such that the vehicle 302 may be seen simultaneously to the surrounding driving conditions.

What is claimed is:

1. A computer-implemented method for projecting incident information within an augmented reality environment based on vehicle movements, the method comprising:
   determining a predicted path of a vehicle based on telemetry data associated with the vehicle;
   obtaining driving conditions associated with a surrounding environment using a sensor, wherein the driving conditions are selected from a group consisting of: image data, audio data and text data;
   identifying an object in the predicted path of the vehicle;
   determining a collision zone on the object and a corresponding collision zone on the vehicle based on physical attributes of the object and the predicted path of the vehicle; and
   generating a display of the driving conditions using an augmented reality device, wherein the display indicates the collision zone on the object and includes a virtual model of the vehicle, wherein the virtual model of the vehicle indicates the corresponding collision zone on the vehicle.

2. The computer-implemented method of claim 1, wherein the virtual model of the vehicle includes information based on a determination of a vehicle damage level in a potential collision with the object.

3. The computer-implemented method of claim 2, further comprising: creating a digital twin instance for the object; simulating a collision between the object and the vehicle using the digital twin instance; and
   updating the vehicle damage level in the potential collision with the object based on a digital twin simulation output.

4. The computer-implemented method of claim 1, further comprising:
   forming a communications network between the vehicle and a second vehicle; and
   obtaining the driving conditions associated with the surrounding environment from the second vehicle.

5. The computer-implemented method of claim 4, wherein the display includes a second virtual model of the second vehicle that indicates a second collision zone on the second vehicle.

6. The computer-implemented method of claim 1, wherein a machine learning model that predicts a path of a moving vehicle based on vehicle data and historical driving information associated with a driver is used to determine the predicted path of the vehicle.

7. The computer-implemented method of claim 1, wherein the augmented reality device is worn by a driver of the vehicle.

8. A computer system for projecting incident information within an augmented reality environment based on vehicle movements, the computer system comprising:
   a processor set;
   one or more computer-readable storage media; and
   program instructions stored on the one or more computer-readable storage media to cause the processor set to:
      determine a predicted path of a vehicle based on telemetry data associated with the vehicle;
      obtain driving conditions associated with a surrounding environment using a sensor, wherein the driving conditions are selected from a group consisting of: image data, audio data and text data;
      identify an object in the predicted path of the vehicle;
      determine a collision zone on the object and a corresponding collision zone on the vehicle based on physical attributes of the object and the predicted path of the vehicle; and
      generate a display of the driving conditions using an augmented reality device, wherein the display indicates the collision zone on the object and includes a virtual model of the vehicle, wherein the virtual model of the vehicle indicates the corresponding collision zone on the vehicle.

9. The computer system of claim 8, wherein the virtual model of the vehicle includes information based on a determination of a vehicle damage level from a potential collision with the object.

10. The computer system of claim 9, further comprising program instructions stored on the one or more computer-readable storage media to cause the processor set to:
    create a digital twin instance for the object;
    simulate a collision between the object and the vehicle using the digital twin instance; and
    update the vehicle damage level in the potential collision with the object based on a digital twin simulation output.

11. The computer system of claim 8, further comprising program instructions stored on the one or more computer-readable storage media to cause the processor set to:
    form a communications network between the vehicle and a second vehicle; and
    obtain the driving conditions associated with the surrounding environment from the second vehicle.

12. The computer system of claim 11, wherein the display includes a second virtual model of the second vehicle that indicates a second collision zone on the second vehicle.

13. The computer system of claim 8, wherein a machine learning model that predicts a path of a moving vehicle based on vehicle data and historical driving information associated with a driver is used to determine the predicted path of the vehicle.

14. The computer system of claim 8, wherein the augmented reality device is worn by a driver of the vehicle.

15. A computer program product for projecting incident information within an augmented reality environment based on vehicle movements, the computer program product comprising:
   one or more non-transitory computer-readable storage media; and
   program instructions stored on the one or more computer-readable storage media to:
      determine a predicted path of a vehicle based on telemetry data associated with the vehicle;
      obtain driving conditions associated with a surrounding environment using a sensor, wherein the driving conditions are selected from a group consisting of: image data, audio data and text data;
      identify an object in the predicted path of the vehicle;
      determine a collision zone on the object and a corresponding collision zone on the vehicle based on physical attributes of the object and the predicted path of the vehicle; and
      generate a display of the driving conditions using an augmented reality device, wherein the display indicates the collision zone on the object and includes a virtual model of the vehicle, wherein the virtual model of the vehicle indicates the corresponding collision zone on the vehicle.

16. The computer program product of claim 15, wherein the virtual model of the vehicle includes information based on a determination of a vehicle damage level from a potential collision with the object.

17. The computer program product of claim 16, further comprising program instructions stored on the one or more computer-readable storage media to:
   create a digital twin instance for the object;
   simulate a collision between the object and the vehicle using the digital twin instance; and
   update the vehicle damage level in the potential collision with the object based on a digital twin simulation output.

18. The computer program product of claim 15, further comprising program instructions stored on the one or more computer-readable storage media to:
   form a communications network between the vehicle and a second vehicle; and
   obtain the driving conditions associated with the surrounding environment from the second vehicle.

19. The computer program product of claim 18, wherein the display includes a second virtual model of the second vehicle that indicates a second collision zone on the second vehicle.

20. The computer program product of claim 15, wherein a machine learning model that predicts a path of a moving vehicle based on vehicle data and historical driving information associated with a driver is used to determine the predicted path of the vehicle.

* * * * *